(12) United States Patent
Stauder et al.

(10) Patent No.: US 6,611,071 B2
(45) Date of Patent: Aug. 26, 2003

(54) EMBEDDED ELECTRONICS FOR HIGH CONVECTION COOLING IN AN ENGINE COOLING MOTOR APPLICATION

(75) Inventors: Frank A. Stauder, London (CA); David J. Naish, London (CA)

(73) Assignee: Siemens Automotive Inc., Mississauga (CA)

( * ) Notice: Subject to any disclaimer, the term of this patent is extended or adjusted under 35 U.S.C. 154(b) by 0 days.

(21) Appl. No.: 09/931,735

(22) Filed: Aug. 17, 2001

(65) Prior Publication Data

US 2003/0034702 A1 Feb. 20, 2003

(51) Int. Cl.[7] .................... H02K 11/00; H02K 9/04
(52) U.S. Cl. ............... 310/62; 310/63; 310/68 R; 361/695
(58) Field of Search .................... 310/62, 63, 52, 310/58, 68 R, 75 R, 89, 91; 361/695, 696, 697

(56) References Cited

U.S. PATENT DOCUMENTS

| | | |
|---|---|---|
| 3,394,682 A | 7/1968 | Bensinger |
| 3,609,991 A | 10/1971 | Chu et al. |
| 3,754,596 A | 8/1973 | Ward, Jr. |
| 4,020,399 A | 4/1977 | Suzuki et al. |
| 4,120,021 A | 10/1978 | Roush |
| 4,327,674 A | 5/1982 | Takei |
| 4,386,361 A | 5/1983 | Simmonds |
| 4,493,010 A | 1/1985 | Morrison et al. |
| 4,504,751 A * | 3/1985 | Meier ............... 310/62 |
| 4,963,778 A * | 10/1990 | Jensen et al. ........ 310/68 D |
| 5,119,466 A * | 6/1992 | Suzuki ............... 388/831 |
| 5,214,564 A | 5/1993 | Metzler et al. |
| 5,225,630 A | 7/1993 | Hopkinson et al. |
| 5,251,484 A | 10/1993 | Mastache |
| 5,504,924 A | 4/1996 | Ohashi et al. |
| 5,719,444 A | 2/1998 | Tilton et al. |
| 5,881,685 A | 3/1999 | Foss et al. |
| 6,134,108 A | 10/2000 | Patel et al. |
| 6,137,680 A | 10/2000 | Kodaira et al. |
| 6,188,574 B1 | 2/2001 | Anazawa |
| 6,219,242 B1 | 4/2001 | Martinez |
| 6,236,562 B1 | 5/2001 | Wilfert et al. |

* cited by examiner

Primary Examiner—Burton S. Mullins

(57) ABSTRACT

A cooling assembly includes an electric motor 10 for driving a fan 16. At least one spoke structure 18 is coupled to and extends generally radially from a periphery of the motor body so as to be exposed to airflow caused by rotation of the fan 16. An electronic component 24 of the motor is operatively associated with the spoke structure 18 such that heat of the electronic component is conducted to the spoke structure and to a spoke extension 22.

20 Claims, 4 Drawing Sheets

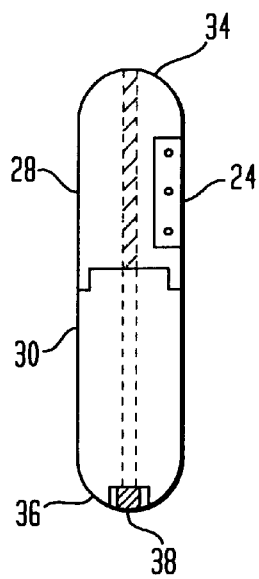
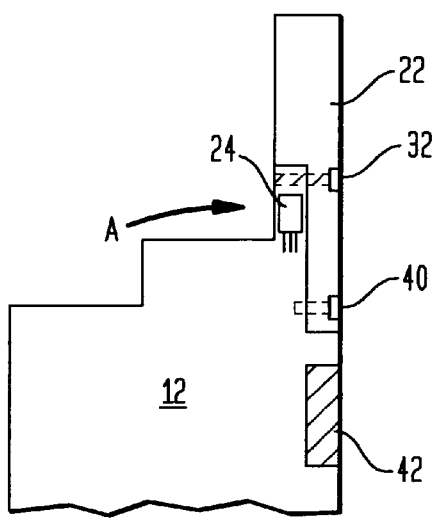
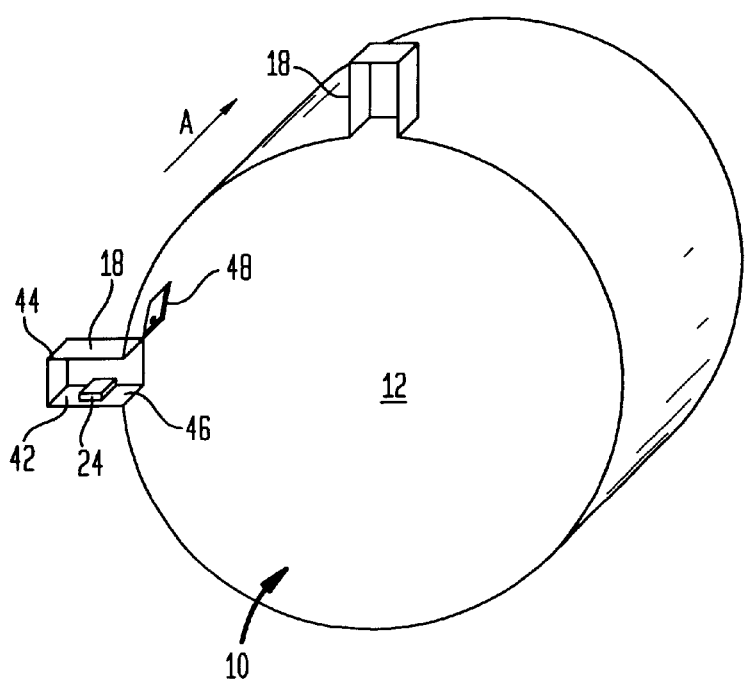

EMBEDDED ELECTRONICS FOR HIGH CONVECTION COOLING IN AN ENGINE COOLING MOTOR APPLICATION

BACKGROUND OF THE INVENTION

The present invention relates generally to electric motors for automobile applications and, more particularly, to locating electronic components of the motor in places which improve cooling of the electronic components.

U.S. Pat. No. 5,119,466 uses pulse width modulation to control the speed of a permanent magnet dc motor. A speed control circuit is carried by a circuit board disposed within the motor. The circuit board includes a motor control signal converter which receives a motor control signal from a vehicle electronic control unit (ECU) and sends a pulse width modulated signal to a field effect transistor (FET), which is also mounted on the circuit board and joined to a projection of the case of the motor. However, the requirement of the circuit board having a signal converter and FET mounted thereon increases the motor cost. Furthermore, the dissipation of heat created by the FET can be improved.

Another known arrangement provides a FET in a separate housing for modulating power to the motor based on a PWM signal from the ECU. However, this arrangement introduces another component mounted in an already crowded engine compartment.

Accordingly, there is a need to provide an engine cooling motor that includes electronics located in such a manner to enhance heat rejection of the electronic components and to isolate the electronic components from heat generated by the motor coil and bearings.

SUMMARY OF THE INVENTION

An object of the invention is to fulfill the need referred to above. In accordance with the principles of the present invention, this objective is achieved by providing a cooling module which includes an electric motor for driving a fan. The motor has a main body. At least one spoke structure is coupled to and extends generally radially from a periphery of the main body so as to be exposed to airflow caused by rotation of the fan. An electronic component of the motor is operatively associated with the spoke structure such that heat of the electronic component is conducted to the spoke structure.

In accordance with another aspect of the invention, a method of providing an electric motor provides a motor for driving a fan. The motor has a main body and spoke structure coupled to and extending generally radially from a periphery of the main body so as to be exposed to airflow caused by rotation of the fan. An electronic component of the motor is located to be operatively associated with the spoke structure such that heat of the electronic component is conducted to the spoke structure.

Other objects, features and characteristics of the present invention, as well as the methods of operation and the functions of the related elements of the structure, the combination of parts and economics of manufacture will become more apparent upon consideration of the following detailed description and appended claims with reference to the accompanying drawings, all of which form a part of this specification.

BRIEF DESCRIPTION OF THE DRAWINGS

Preferred embodiments of the invention are described in greater detail herein below with reference to the drawings wherein:

FIG. 6 is a view of a spoke structure coupled with a spoke extension in accordance with another embodiment of the invention.

FIG. 7 is a partial view of an engine cooling motor having embedded electronics in accordance with the invention and showing the spoke extension connection to the motor.

FIG. 8 is a schematic view of engine cooling motor showing another embodiment of the spoke structure.

DETAILED DESCRIPTION OF THE PREFERRED EMBODIMENTS

In general, the engine cooling electric motor assembly of the present invention may be adapted for a number of different automotive applications including heating, ventilation, air conditioning systems, engine radiator cooling fans, etc.

Figure 1:
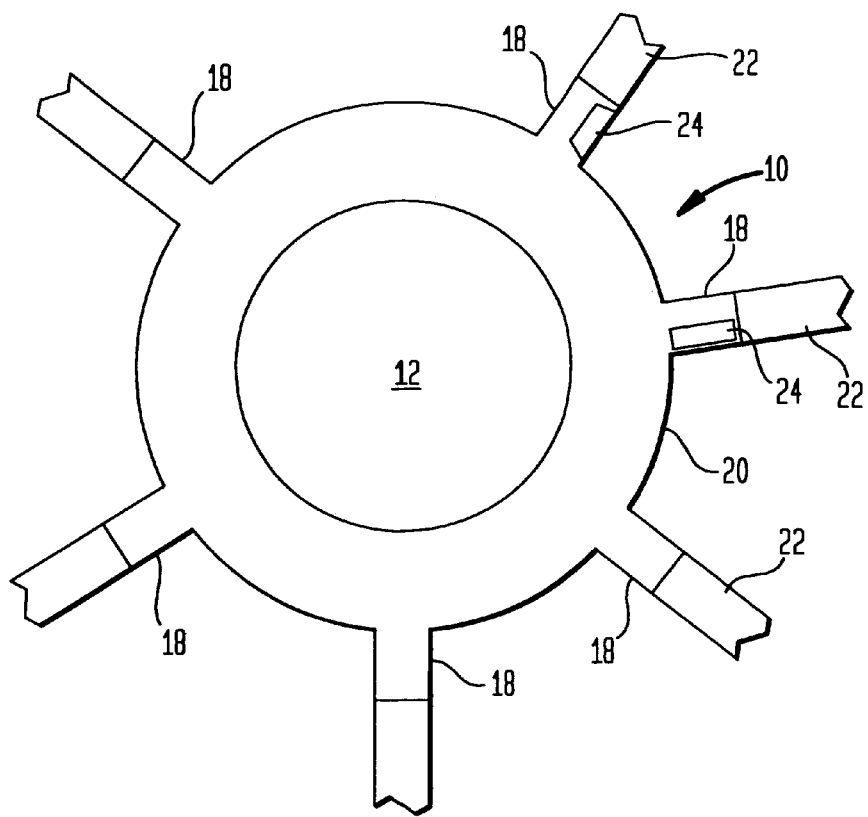
FIG. 1 is a schematic plan view of an engine cooling motor having embedded electronic components provided in accordance with the principles of the present invention.

Referring now in detail to the drawings wherein like numerals identify similar or like elements through several views, FIG. 1 illustrates an electric cooling motor, generally indicated at 10, provided in accordance with principles of the present invention.

Figure 2:
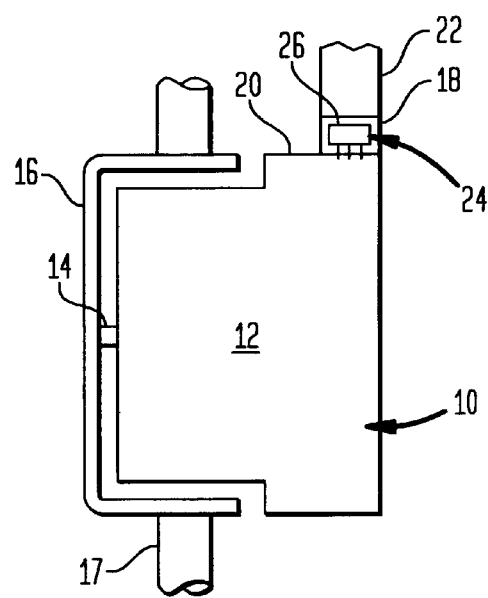
FIG. 2 is a side view of the engine cooling motor of FIG. 1 shown with a fan attached thereto.

As best shown in FIG. 2, the motor 10 has a main body 12 housing the conventional motor components (not shown) to cause rotation of a shaft 14. The shaft 14 is coupled to a fan 16 having blades 17 for causing airflow. For clarity of illustration of the motor 10, the fan 16 is not shown in FIG. 1.

Figure 3A:
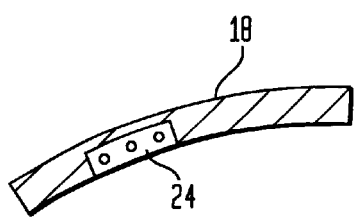
FIGS. 3a–3b are cross-sectional views of spoke structure of the engine cooling motor of the invention.
Figure 3B:
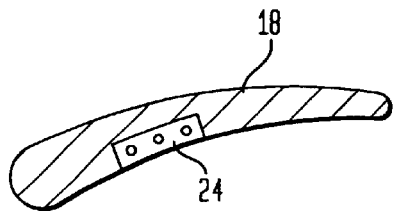

At least one spoke structure 18 is coupled to and extends generally radially from a periphery 20 of the main body 12 so as to be exposed to airflow caused by rotation of the fan 16. In the embodiment, a plurality of spoke structures 18 are provided. At least a portion of each spoke structure 18 is made of metal, or other material with equal or better mechanical strength and heat transfer properties. The spoke structures 18 are generally short in length and are coupled to spoke extensions 22, which can be considered to be extensions of the spoke structures 18. The spoke extensions 22 can be stators and can be composed of the same material, or different material, as the spoke structure 18. The spoke structures 18 may be machined as part of the metal main body 12, machined separately and attached to the main body, or cast into an aluminum motor configuration. As shown in FIG. 3a, the cross-section of the spoke structure 18 can be of any shape, such as rectangular, or as shown in FIG. 3b, the cross-section can be an airfoil shape to minimize drag.

An electronic component 24 of the motor 10 is operatively associated with a spoke structure 18 such that heat of the electronic component 24 is conducted to the spoke structure 18, and to the spoke extension 22. More particularly, as shown in FIGS. 1 and 2, the electronic component 24, such as a MOSFET, capacitor, or other high heat generating component, is embedded in an associated spoke structure 18. A non-electrically conductive but thermally conductive fluid (such as 3M Fluorinert), paste or potting 26, can be used to surround the component 24 to enhance thermal rejection.

Thus, since the spoke structure 18 is positioned in the main flow of the fan 16, when the component 24 generates heat, heat is conducted to the spoke structure 18 and to the spoke extension 22 and the spoke structure 18 and spoke extension 22 are cooled by the high velocity airflow caused by the fan 16.

Figure 4:
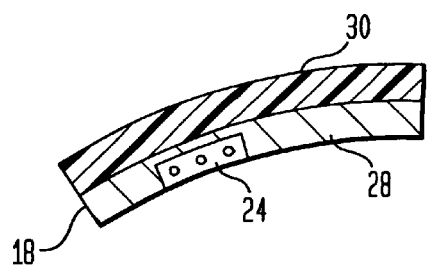
FIG. 4 is a cross-sectional view of a spoke structure of the invention shown joined with a spoke extension.
Figure 5:
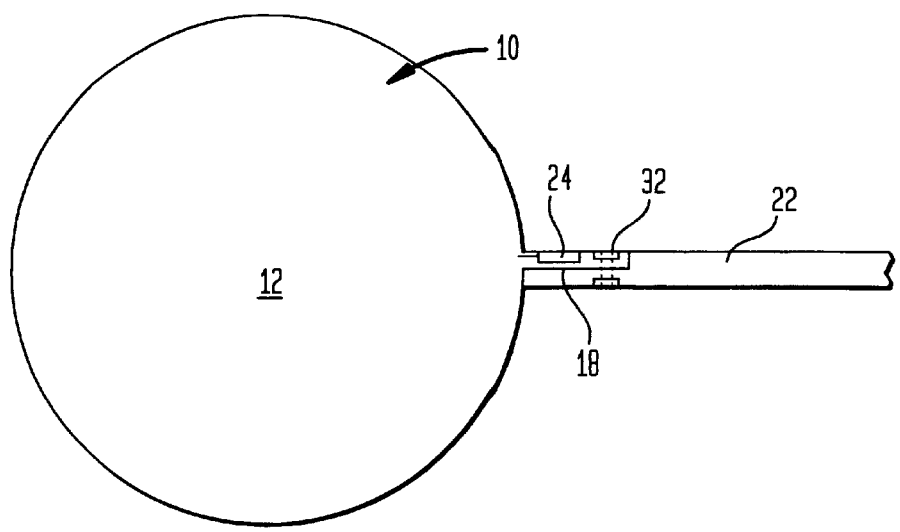
FIG. 5 is a schematic view of a cooling motor of the invention showing a connection between the spoke structure and the spoke extension.

With reference to FIGS. 4 and 5, the spoke structure 18 may include a metal portion 28 and an extension 30 coupled to the metal portion. FIG. 4 shows the spoke structure 18 is split side to side, while FIG. 6 shows the spoke structure 18 split so that the leading edge 34 is metal and the trailing edge 36, for example, is plastic. A fastener 38 is shown joining the portions 28 and extension 30 in FIG. 6.

The extension 30 may be separate from or part of the spoke extension 22. With reference to FIG. 5, the spoke extension 22 can be attached to the spoke structure 18 by a fastener 32.

As shown in FIG. 7, the spoke extension 22 can be coupled to the main body 12 via a fastener 40. Airflow direction is shown by arrow A. A bearing is indicated at 42. Thus, as shown, the electronic components 24 are embedded in the spoke structure 18 at a location so as to be isolated from heat generated by the motor coil and bearings.

FIG. 8 shows another embodiment of the spoke structure 18. The spoke structure 18 defines a cavity 42 having an opened end 44. The electronic component 24 is placed in the cavity 42 and the cavity 42 is filled with a thermally conductive material 46 such as potting, solution, or paste. In this configuration, a landing surface 48 is defined for accurate motor placing.

Figure 9:
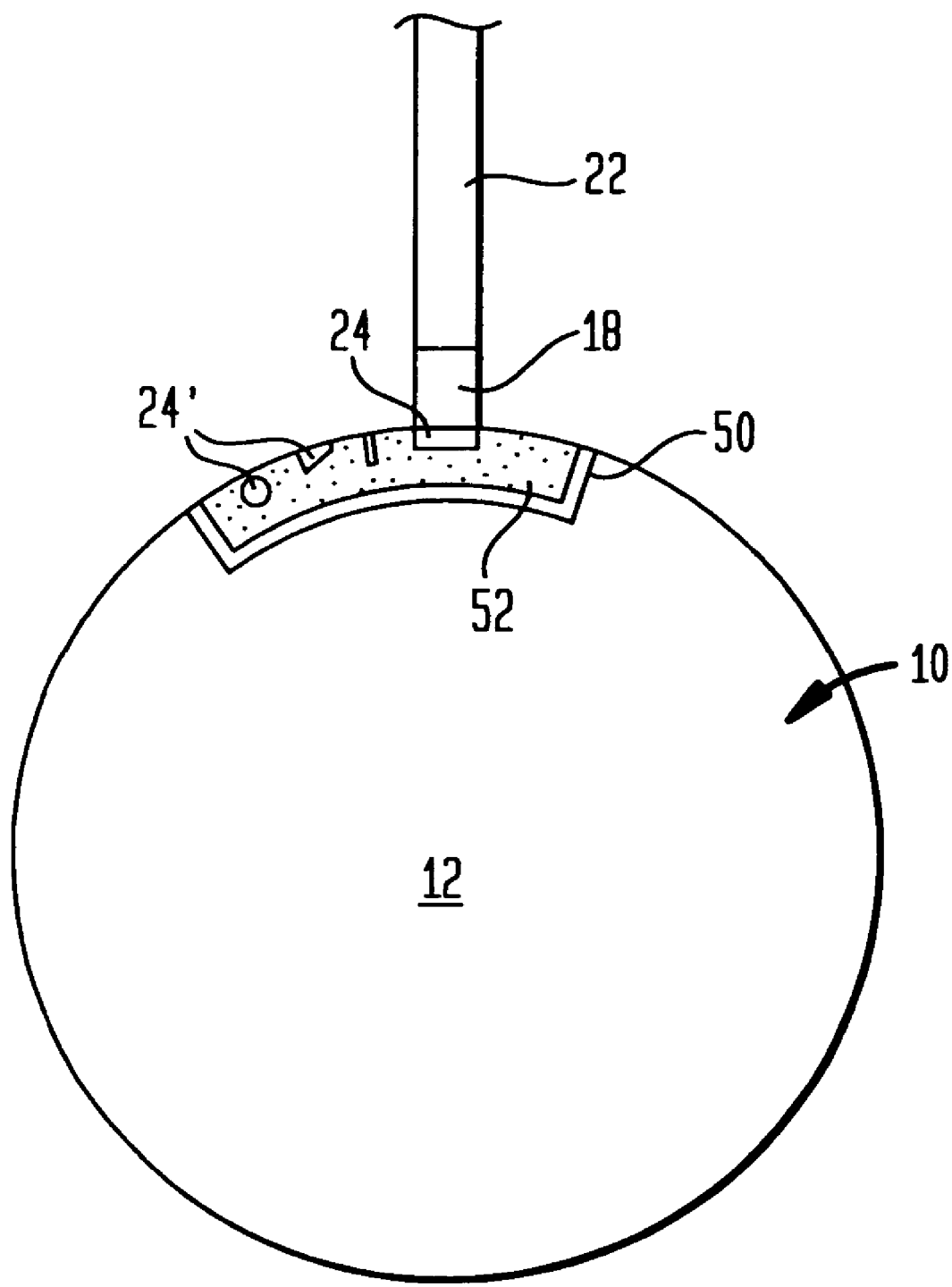
FIG. 9 is a schematic view of another embodiment of an engine cooling motor having electronics and spoke structure in contact with an electronic component.

Instead of embedding the component 24 in the spoke structure 18, as shown in FIG. 9, the component 24 can be embedded in the main body 12 of the motor 10 and positioned such that the component 24 contacts the spoke structure 18. Thus, the main body includes a cavity 50 for receiving the component 24 and other electronic components 24'. The cavity 50 is filled with highly thermally conductive potting 52, solution, or paste. Hence, heat of the component 24 is conducted to the spoke structure 18 which is cooled by the fan airflow.

With the construction and arrangement of the motor of the disclosed embodiment, the axial length of the motor can be reduced since electronic components are relocated from the rear of the motor to the radial spoke structure. This is an area of the cooling module that is not used in typical designs, yet is available and is connected to the motor.

Although metal and plastic have been disclosed for materials for the spoke structures 18 and spoke extensions 22, any material that provides support and achieves acceptable heat transfer can be employed.

Good heat rejection for the electronic components of the motor increases component life, improves efficiency, and allows for lower grade components to be used in the design. Lower grade components are often less expensive, thus the cost of the motor can be reduced.

The foregoing preferred embodiments have been shown and described for the purposes of illustrating the structural and functional principles of the present invention, as well as illustrating the methods of employing the preferred embodiments and are subject to change without departing from such principles. Therefore, this invention includes all modifications encompassed within the spirit of the following claims.

What is claimed is:

1. A motor assembly comprising:
    an electric motor for driving a fan, the motor having a main body,
    at least one spoke structure coupled to and extending generally radially from a periphery of the main body so as to be exposed to airflow caused by rotation of the fan; and
    an electronic component of the motor operatively associated with the spoke structure such that heat of the electronic component is conducted to the spoke structure.

2. The motor assembly of claim 1, wherein the electronic component is embedded in the spoke structure.

3. The motor assembly of claim 2, further comprising a non-electrically conductive and thermally conductive fluid in contact with the electronic component.

4. The motor assembly of claim 1, wherein the electronic component is mounted in the main body and contacts a portion of the spoke structure.

5. The motor assembly of claim 4, further comprising a non-electrically conductive and thermally conductive fluid in contact with the electronic component.

6. The motor assembly of claim 1, wherein a plurality of spoke structures are provided, with an electronic component being operatively associated with a respective one of the spoke structures.

7. The motor assembly of claim 1, wherein the electronic component is a MOSFET.

8. The motor assembly of claim 1, wherein the electronic component is a high heat generating electronic component.

9. The motor assembly of claim 1, wherein the spoke structure is made at least partially from metal.

10. The motor assembly of claim 1, wherein the spoke structure is coupled to a spoke extension such that the spoke extension extends from an end of the spoke structure.

11. A motor assembly comprising:
    an electric motor for driving a fan, the motor having a main body,
    means for conducting heat coupled to and extending generally radially from a periphery of the main body so as to be exposed to airflow caused by rotation of the fan; and an electronic component of the motor operatively associated with the means for conducting heat such that heat of the electronic component is conducted to the means or conducting heat, wherein the means for conducting heat includes a plurality of spoke structures, with an electronic component being operatively associated with at least one of the spoke structures.

12. The motor assembly of claim 11, wherein the electronic component is embedded in the at least one spoke structure.

13. The motor assembly of claim 12, further comprising a non-electrically conductive and thermally conductive fluid in contact with the electronic component.

14. The motor assembly of claim 11, wherein the electronic component is a MOSFET.

15. The motor assembly of claim 11, wherein the electronic component is a high heat generating electronic component.

16. The motor assembly of claim 11, wherein the at least one spoke structure is made at least partially from metal.

17. The motor assembly of claim 11, wherein the at least one spoke structure is coupled to a spoke extension such that the spoke extension extends from an end of the at least one spoke structure.

18. A motor assembly comprising:

an electric motor for driving a fan, the motor having a main body, means for conducting heat coupled to and extending generally radially from a periphery of the main body so as to be exposed to airflow caused by rotation of the fan; and an electronic component of the motor operatively associated with the means for conducting heat such that heat of the electronic component is conducted to the means for conducting heat, wherein the electronic component is mounted in the main body and contacts a portion of the means for conducting heat.

19. The motor assembly of claim 18, further comprising a non-electrically conducive and thermally conductive fluid in contact with the electronic component.

20. A method of providing an electric motor comprising:

providing a motor for driving a fan, the motor having a main body and spoke structure coupled to and extending generally radially from a periphery of the main body so as to be exposed to airflow caused by rotation of the fan; and locating an electronic component of the motor to be operatively associated with the spoke structure such that heat from the electronic component is conducted to the spoke structure.

* * * * *